(12) United States Patent
Hirosawa

(10) Patent No.: US 9,316,872 B2
(45) Date of Patent: Apr. 19, 2016

(54) LIQUID CRYSTAL DISPLAY DEVICE THAT EXPANDS THE TRANSMISSIVE AREA

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/445,201

(22) Filed: Jul. 29, 2014

(65) Prior Publication Data

US 2015/0092146 A1    Apr. 2, 2015

(30) Foreign Application Priority Data

Sep. 30, 2013   (JP) ................................. 2013-203442

(51) Int. Cl.
*G02F 1/1362* (2006.01)
*G02F 1/1337* (2006.01)
*G02F 1/1343* (2006.01)
*G02F 1/1368* (2006.01)

(52) U.S. Cl.
CPC .... *G02F 1/134336* (2013.01); *G02F 1/134363* (2013.01); *G02F 1/136213* (2013.01); *G02F 2001/134381* (2013.01)

(58) Field of Classification Search
CPC ..................... G02F 1/134336; G02F 1/134363
USPC ........................................................ 349/141
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |

FOREIGN PATENT DOCUMENTS

| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 5/2005 |
| JP | 2005-242307 | 9/2005 |
| JP | 2011-209454 | 10/2011 |

OTHER PUBLICATIONS

U.S. Appl. No. 14/504,546, filed Oct. 2, 2014, Hirosawa.

*Primary Examiner* — Joseph L Williams
(74) *Attorney, Agent, or Firm* — Oblon, McClelland, Maier & Neustadt, L.L.P.

(57) ABSTRACT

An array substrate includes a semiconductor layer, a first insulating film covering the semiconductor layer, a gate line extending in a first direction on the first insulating film, a second insulating film covering the gate line, a source line extending in a second direction orthogonally crossing the first direction on the second insulating film. A contact portion is formed on the second insulating film. The contact portion contacts with the semiconductor layer. A third insulating film covers the source line and exposing the contact portion and the second insulating film in a circumference of the contact portion.

19 Claims, 12 Drawing Sheets

LIQUID CRYSTAL DISPLAY DEVICE THAT EXPANDS THE TRANSMISSIVE AREA

CROSS-REFERENCE TO RELATED APPLICATION

This application is based upon and claims the benefit of priority from prior Japanese Patent Application No. 2013-203442 filed Sep. 30, 2013, the entire contents of which are incorporated herein by reference.

FIELD

Embodiments described herein relate generally to a liquid crystal display device.

BACKGROUND

In recent years, a liquid crystal display device using lateral electric field, such as IPS (In-Plane Switching) mode and FFS (Fringe Field Switching) mode is developed in an active matrix type liquid crystal display device equipped with a switching element in each pixel.

The liquid crystal display device using the lateral electric field mode is equipped with a pixel electrode and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate. As one example, the array substrate includes a common electrode different from the common electrode in the counter substrate and facing a source line so as to shield electric field from the source line.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
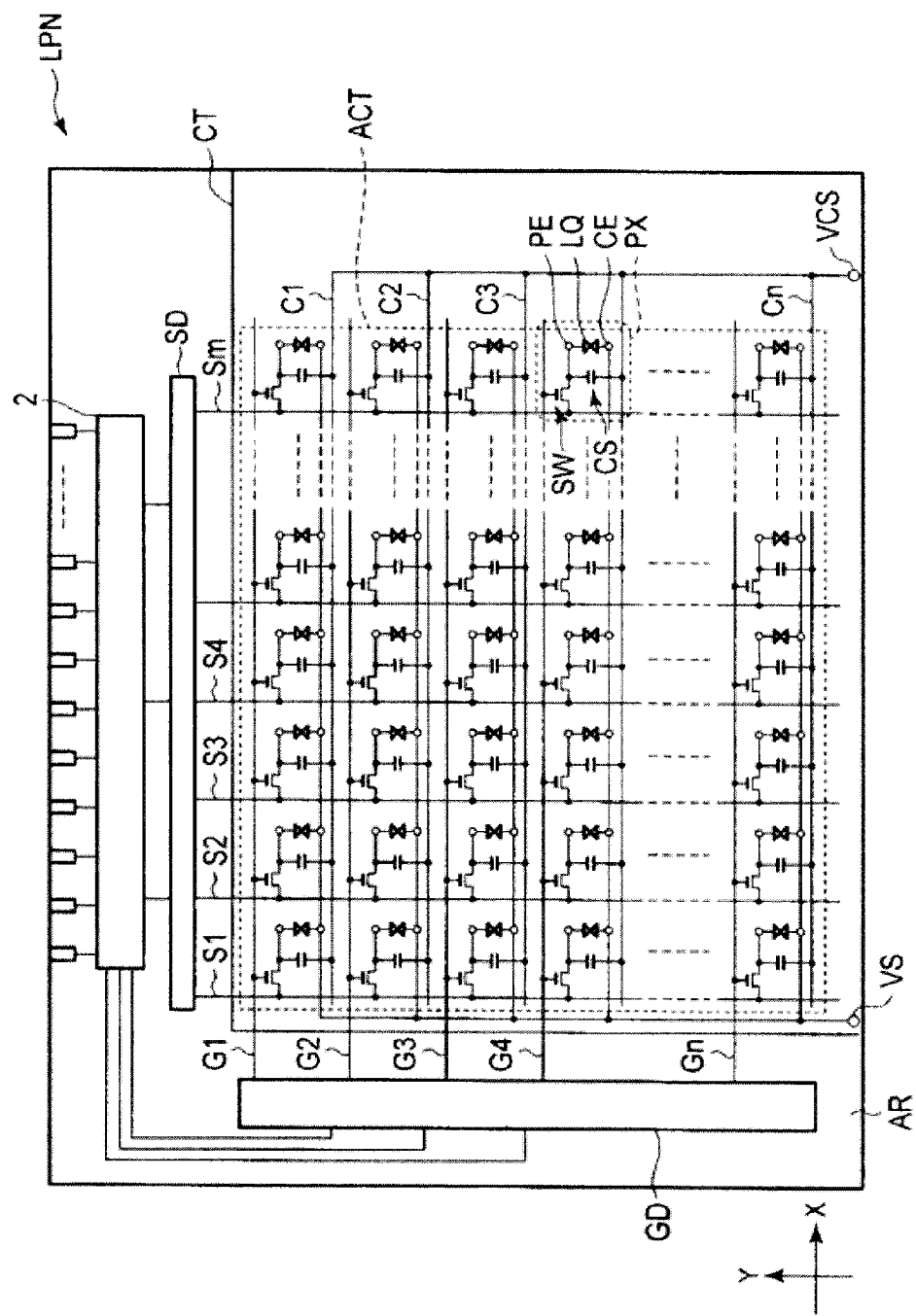
FIG. 1 is a figure schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device comprises: a first substrate including; a semiconductor layer, a first insulating film covering the semiconductor layer, a gate line extending in a first direction on the first insulating film, a second insulating film covering the gate line, a source line extending in a second direction orthogonally crossing the first direction on the second insulating film, a contact portion formed on the second insulating film, the contact portion contacting with the semiconductor layer, a third insulating film covering the source line and exposing the contact portion and the second insulating film in a circumference of the contact portion, a sub-common electrode extending in the first direction so as to face the gate line and crossing the source line on the third insulating film, a first main-common electrode connected with the sub-common electrode and extending along the source line in the second direction on the third insulating film, a fourth insulating film covering the sub-common electrode and the first main-common electrode, a second main-common electrode extending in the second direction on the fourth insulating film, the second main-common electrode facing the source line and being set to the same potential as the first main-common electrode, a pixel electrode including a main pixel electrode apart from the second main-common electrode and extending in the second direction on the fourth insulating film, the pixel electrode being electrically connected with the contact portion, and a first alignment film covering the second main-common electrode and the pixel electrode, a second substrate arranged so as to face the first substrate, and a liquid crystal layer held between the first substrate and the second substrate.

According to other embodiment, a liquid crystal display device comprises: a first substrate including; a semiconductor layer, a first insulating film covering the semiconductor layer, a gate line formed on the first insulating film and extending in a first direction, a second insulating film covering the gate line, a source line extending in a second direction orthogonally crossing the first direction on the second insulating film, a contact portion formed on the second insulating film, the contact portion contacting with the semiconductor layer, a third insulating film covering the source line and exposing the contact portion and the second insulating film in a circumference of the contact portion, a first main-common electrode extending along the source line in the second direction on the third insulating film, a fourth insulating film covering the first main-common electrode, a second main-common electrode extending in the second direction on the fourth insulating film, the second main-common electrode facing the source line and being set to the same potential as the first main-common electrode, and a pixel electrode including a main pixel electrode apart from the second main-common electrode and extending in the second direction on the fourth insulating film, the pixel electrode being electrically connected with the contact portion, and a first alignment film covering the second main-common electrode and the pixel electrode, a second substrate arranged so as to face the first substrate, and a liquid crystal layer held between the first substrate and the second substrate.

According to other embodiment, a liquid crystal display device comprising: a first substrate including; a semiconductor layer, a first insulating film covering the semiconductor layer, a gate line extending in a first direction on the first insulating film, a second insulating film covering the gate line, a source line extending in a second direction orthogonally crossing the first direction on the second insulating film, a contact portion formed on the second insulating film, the contact portion contacting with the semiconductor layer, a third insulating film covering the source line, and exposing the contact portion and the second insulating film in a circumference of the contact portion, a sub-common electrode extending in the first direction so as to face the gate line and crossing the source line on the third insulating film, a fourth insulating film covering the sub-common electrode, a first main-common electrode extending in the second direction on the fourth insulating film, the first main-common electrode facing the source line, and a pixel electrode including a first main pixel electrode apart from the first main-common electrode and extending in the second direction on the fourth insulating film, the pixel electrode being electrically connected with the contact portion, and a first alignment film covering the first main-common electrode and the pixel electrode, a second substrate arranged so as to face the first substrate, and a liquid crystal layer held between the first substrate and the second substrate a liquid crystal display device, includes:

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is formed of a plurality of pixels PX arranged in a matrix shape.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X. The source lines S cross the gate line G and the capacitance line C. The source lines S linearly extend in the second direction Y, respectively. The gate line G, the auxiliary capacitance line C and the source lines S may not necessarily extend linearly, and a portion thereof may be crooked partly.

Each gate line G is pulled out to outside of the active area ACT, and connected to a gate driver GD. Each source line S is pulled out to the outside of the active area ACT, and connected to a source driver SD. At least portions of the gate driver GD and the source driver SD are formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which auxiliary capacitance voltage is impressed.

The switching element SW is formed of an n channel type thin film transistor (TFT), for example. The switching element SW is electrically connected with the gate line G and the source line S. The switching element SW may be either a top-gate type or a bottom-gate type. Though the semiconductor layer of the switching element SW is formed of poly-silicon in this embodiment, the semiconductor layer may be formed of amorphous silicon.

The pixel electrode PE is arranged in each pixel PX and electrically connected with the switching element SW. The common electrode CE of common potential is arranged in common to the plurality of pixel electrodes PE interposing the liquid crystal layer LQ. An electric power supply portion VS is formed outside of the active area ACT in the array substrate AR to impress a voltage to the common electrode CE. Furthermore, the common electrode CE is drawn to outside of the active area ACT and electrically connected with the electric power supply portion VS through an electric conductive component which is not illustrated.

In addition, in the liquid crystal display panel LPN according to this embodiment, while the pixel electrode PE is formed in the array substrate AR, at least a portion of the common electrode CE is also formed in the array substrate AR. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to a X-Y plane specified by the first direction X and the second direction Y, i.e., the substrates (or lateral electric field substantially in parallel with the principal surface of the array substrate AR.)

Figure 2:
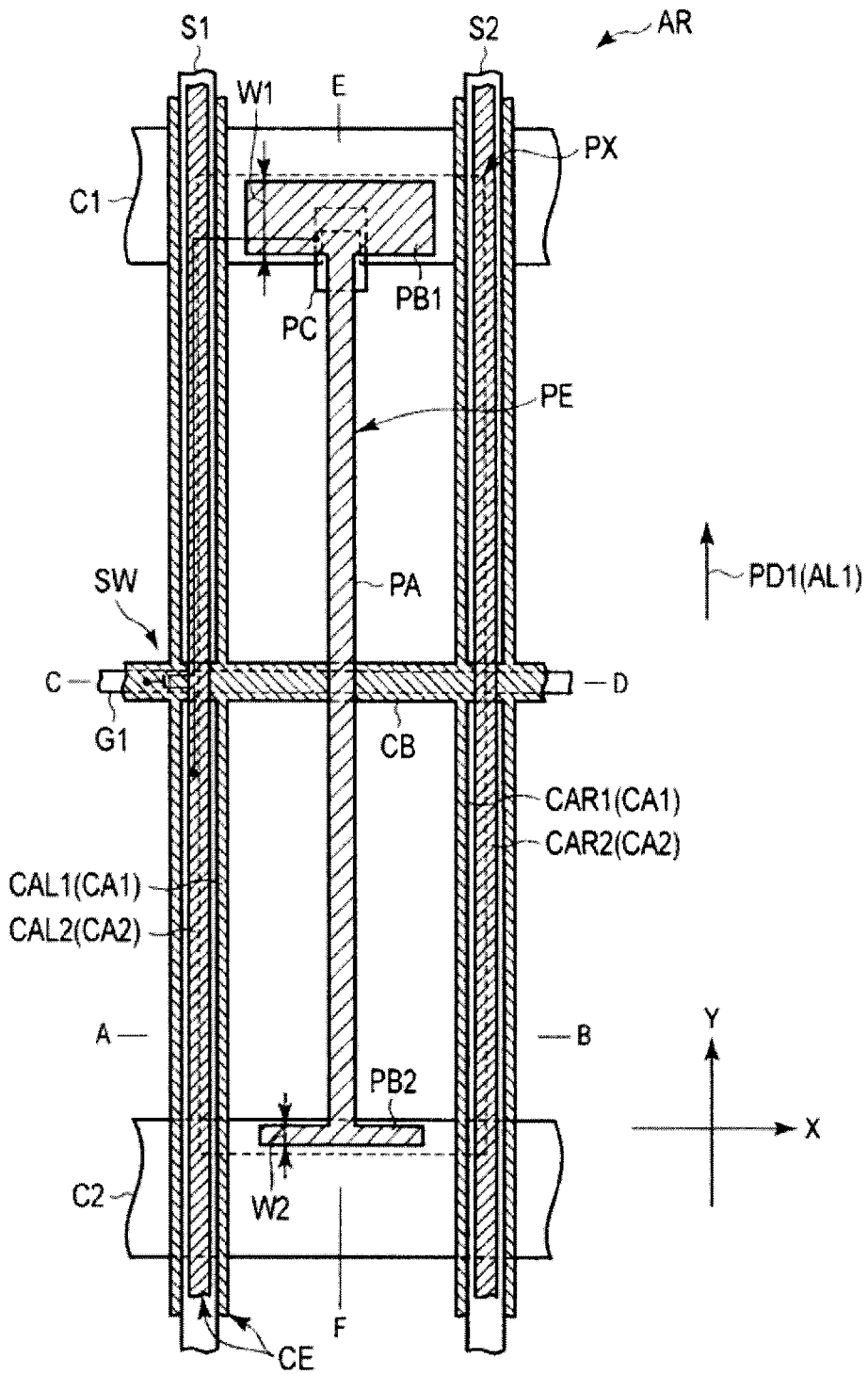
FIG. 2 is a plan view schematically showing a structure of one pixel PX when an array substrate AR shown in FIG. 1 is seen from a counter substrate side according to the embodiment.

FIG. 2 is a plan view schematically showing a structure of one pixel when an array substrate AR shown in FIG. 1 is seen from a counter substrate side according to the embodiment.

The array substrate AR is equipped with a gate line G1, an auxiliary capacitance line C1, an auxiliary capacitance line C2, a source line S1, a source line S2, a switching element SW, a pixel electrode PE, and a portion of a common electrode CE, a first alignment film ALL etc.

The auxiliary capacitance line C1 and the auxiliary capacitance line C2 are arranged at intervals along the second direction Y, and extend in the first direction X, respectively. The gate line G1 is located between the auxiliary capacitance line C1 and the auxiliary capacitance line C2, and extend along the first direction X. In this embodiment, the gate line G1 is located in an approximately center between the auxiliary capacitance line C1 and the auxiliary capacitance line C2. That is, the interval between the gate line G1 and the auxiliary capacitance line C1 in the second direction Y is approximately the same as the interval between the gate line G1 and the auxiliary capacitance line C2 in the second direction Y. The source line S1 and the source line S2 are arranged at intervals along the first direction X, and extend in the second direction Y, respectively. The pixel electrode PE is arranged between the adjoining source line S1 and the source line S2.

In this embodiment, the pixel PX corresponds to a square region surrounded with the auxiliary capacitance lines C1 and C2 and the source lines S1 and S2, and is formed in the shape of a rectangle whose length in the first direction X is shorter than the length in the second direction Y, as shown with a dashed line in FIG. 2. The length in the first direction X of the pixel PX corresponds to a pitch between the source line S1 and the source line S2 in the first direction X, and the length in the second direction Y of the pixel PX corresponds to a pitch between the auxiliary capacitance C1 and the auxiliary capacitance line C2 in the second direction Y.

In the illustrated pixel PX, the source line S1 is arranged at the left-hand side end in the pixel PX. Precisely, the source line S1 is arranged striding over a boundary between the illustrated pixel PX and a pixel adjoining the illustrated pixel PX on the left-hand side. The source line S2 is arranged at the right-hand side end. Similarly, the source line S2 is arranged striding over a boundary between the illustrated pixel PX and a pixel adjoining the illustrated pixel PX on the right-hand side. Moreover, in the pixel PX, the auxiliary capacitance line C1 is arranged in an upper end portion. Precisely, the auxiliary capacitance line C1 is arranged striding over a boundary between the illustrated pixel PX and a pixel adjoining the illustrated pixel PX on its upper end side. The auxiliary capacitance line C2 is arranged in a lower end portion. Precisely, the auxiliary capacitance line C2 is arranged striding over a boundary between the illustrated pixel PX and a pixel adjoining the illustrated pixel PX on its lower end side. The gate line G1 is arranged approximately in a central portion of the pixel PX.

The switching element SW is electrically connected with the gate line G1 and the source line S1, and arranged near an intersection between the gate line G1 and the source line S1. A contact portion PC is electrically connected with the switching element SW. The contact portion PC is eccentrically located on a region overlapping with the auxiliary capacitance line C1 so as to close to the side of the contact portion PC.

The pixel electrode PE is electrically connected with the contact portion PC in the position which overlaps with the auxiliary capacitance line C1. The pixel electrode PE is equipped with a main pixel electrode PA, a first sub-pixel electrode PB1, and a second sub-pixel electrode PB2. The main pixel electrodes PA, the first sub-pixel electrode PB1, and the second sub-pixel electrode PB2 are formed integrally or continuously, and electrically connected mutually.

The main pixel electrode PA is located between the source line S1 and the source line S2, and linearly extends to near an upper end and a bottom end of the pixel PX along the second direction Y. In this embodiment, the main pixel electrode PA is located in an approximately center between the source line S1 and the source line S2. That is, the interval between the source line S1 and the main pixel electrode PA in the first direction X is approximately the same as the interval between the source line S2 and the main pixel electrode PA. The main pixel electrode PA is formed in a stripe shape with substantially the same width along the first direction X.

The first sub-pixel electrode PB1 lineally extends between the source line S1 and the source line S2 along the first direction X. The first sub-pixel electrode PB1 is connected with an end portion of the main pixel electrode PA, and located in a region which overlaps with the auxiliary capacitance line C1 and eccentrically-located on the gate line side. Moreover, at least a portion of the first sub-pixel electrode PB1 overlaps with the contact portion PC, and is electrically in contact with the contact portion PC. The first sub-pixel electrode PB1 is formed in a stripe shape with substantially the same width W1 along the second direction Y.

The second sub-pixel electrode PB2 lineally extends between the source line S1 and the source line S2 along the first direction X. The second sub-pixel electrode PB2 is connected with the other end portion of the main pixel electrode PA, and located in a region which overlaps with the auxiliary capacitance line C2 and eccentrically-located on the gate line side. The second sub-pixel electrode PB2 is formed in a stripe shape with substantially the same width W2 along the second direction Y.

Although not illustrated, one auxiliary capacitance line is arranged striding over two pixels which adjoin in the second direction Y, mutually. The first sub-pixel electrode PB1 of the pixel electrode in one pixel and the second sub-pixel electrode PB2 in the adjacent pixel in the second direction Y are arranged at intervals in the region which overlaps with the auxiliary capacitance line. While the first sub-pixel electrode PB1 is formed broadly to secure an area required for contacting with the contact portion PC, the second sub-pixel electrode PB2 may function as an electrode for forming electric field. For this reason, the width W1 of the first sub-pixel electrode PB1 is larger than the width W2 of the second sub-pixel electrode PB2.

The common electrode CE is equipped with a first main-common electrode CA1, a second main-common electrode CA2, and a sub-common electrode CB. The first main-common electrode CA1 and the sub-common electrode CB are integrally or continuously formed, and electrically connected with mutually. While the second main-common electrode CA2 is arranged apart from the first main-common electrode CA1, etc., the second main-common electrode CA2 and the first main-common electrode CA1 are electrically connected with mutually. That is, the first main-common electrode CA1 and the second main-common electrode CA2 are connected with the electric power supply portion VS in the outside of the active area ACT, and set to the same potential each other.

The first main-common electrode CA1 extends along the source line S. The first main-common electrode CA1 is located on the both sides sandwiching the main pixel electrode PA in the X-Y plane, and linearly extends along the second direction Y. The first main-common electrode CA1 is arranged on the pixel electrode PE side rather than the position which overlaps with the source line S. The first main-common electrode CA1 is formed in a stripe shape with the same width along the first direction X.

In this embodiment, the first main-common electrode CA1 is arranged in two parallel lines in the first direction X, and is equipped with a first main-common electrode CAL1 located in the left-hand side end, and a first main-common electrode CAR1 located in the right-hand side end of the pixel PX. While the first main-common electrode CAL1 extends along the source line S1 and is arranged on the pixel electrode PE side rather than the position which overlaps with the source line S1, a portion thereof may be arranged overlapping with the source line S1. Similarly, while the first main-common electrode CAR1 extends along the source line S2 and is arranged on the pixel electrode PE side rather than the position which overlaps with the source line S2, a portion thereof may be arranged overlapping with the source line S2.

The sub-common electrode CB faces the gate line G1. That is, the sub-common electrode CB linearly extends along the first direction X in the X-Y plane. The sub-common electrode CB is formed in a stripe shape with the same electrode width in the second direction Y. The electrode width of the sub-common electrode CB along the second direction Y is larger than the width of the gate line G1 in the second direction Y, for example. That is, the sub-common electrode CB is arranged so as to extend a little toward the auxiliary capacitance lines C1 and C2 beyond the position which overlaps with the gate line G1. The sub-pixel electrode CB is connected with the first main-common electrode CAL1 on the left end side of the pixel, and the first main-common electrode CAR1 on the right end side of the pixel.

The second main-common electrode CA2 counters the source line S. That is, the second main-common electrode CA2 is located on the both sides sandwiching the main pixel electrode PA in the X-Y plane, and linearly extends along the second direction Y. The second main-common electrode CA2 extends substantially in parallel to the first main-common electrode CAL The second main-common electrode CA2 is formed in the shape of a stripe with a smaller width than the width of the source line S and substantially the same width along the first direction X.

In this embodiment, the second main-common electrode CA2 is arranged in two parallel lines at intervals in the first direction X, and includes a second main-common electrode CAL2 located on the left-hand side of the pixel PX and arranged striding over a boundary between the illustrated pixel PX and a pixel adjoining the illustrated pixel PX on the left-hand side, and a second main-common electrode CAR2 located on the right-hand side of the pixel PX and arranged striding over a boundary between the illustrated pixel PX and a pixel adjoining the illustrated pixel PX on the right-hand side. The second main-common electrode CAL2 extends parallel with the first main-common electrode CAL1 with a smaller width than the width of the source line S1, and is arranged in a location overlapping with the source line S1. The second main-common electrode CAL2 crosses the sub-pixel electrode CB on the source line S1. Further, the second main-common electrode CAR2 extends along the first main-common electrode CAR1 with a smaller width than the width of the source line S2, and is arranged in a location overlapping with the source line S2 so as to cross the sub-pixel electrode CB on the source line S2.

In the array substrate AR, the pixel electrode PE and the second main-common electrode CA2 are covered with the first alignment film ALL Alignment treatment is carried out to the first alignment film AL1 along with an alignment treatment direction PD1 to initially align liquid crystal molecules of the liquid crystal layer LQ. The alignment treatment direction PD1 is substantially in parallel to the second direction Y, for example.

Figure 3:
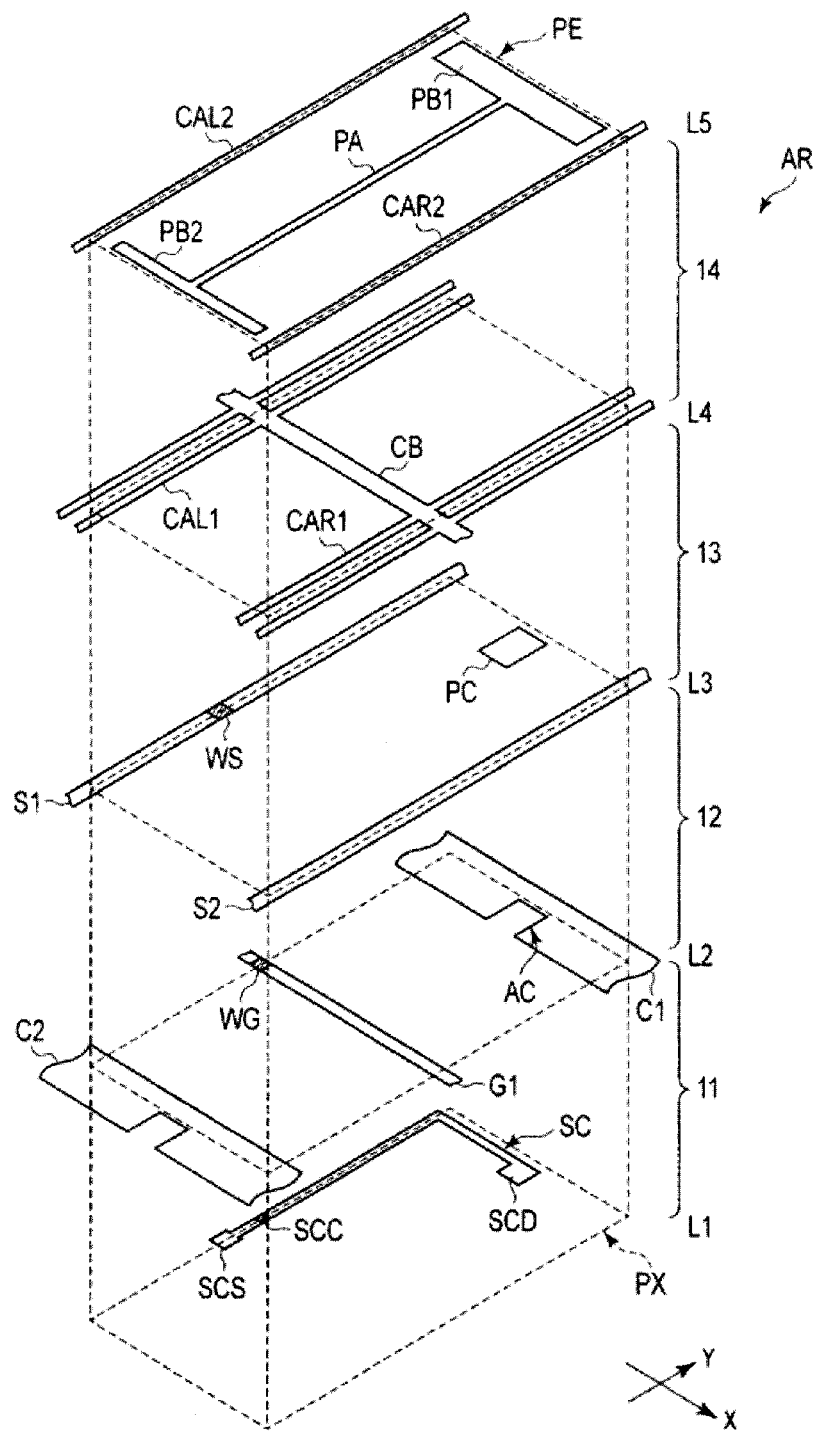
FIG. 3 is an exploded perspective view schematically showing a main layer structure forming the array substrate AR shown in FIG. 2.

FIG. 3 is an exploded perspective view schematically showing a main layer structure forming the array substrate AR shown in FIG. 2. In addition, the main electric conductive layers in the array substrate AR are illustrated here.

A first insulating film 11 is interposed between a first layer L1 and a second layer L2, a second insulating film 12 is interposed between the second layer L2 and a third layer L3, a third insulating film 13 is partly interposed between the third layer L3 and a fourth layer L4, and a fourth insulating film 14 is interposed between a fourth layer L4 and a fifth layer L5.

In the first layer L1, a semiconductor layer SC of the switching element is formed. For example, the semiconductor layer SC is formed with poly-silicon. The semiconductor layer SC extends under the source line S1 to an under portion of the auxiliary capacitance line C1 intersecting the gate line G1. A region of the semiconductor layer SC located under the gate line G1 forms a channel region SCC, a region of the semiconductor layer SC on the side in which the semiconductor layer SC contacts with the source line S1 forms a source region SCS, and a region of the semiconductor layer SC extending to the under portion of the auxiliary capacitance line C1 from the channel region SCC forms a drain region SCD.

In the second layer L2, the auxiliary capacitance line C1, the gate line G1, and the auxiliary capacitance line C2 are arranged. The auxiliary capacitance line C1 is located above a portion of the drain region SCD and extends in the first direction X. An aperture portion (cutting out portion) AC is formed in the auxiliary capacitance line C1 facing the drain region SCD. In the gate line G1, a region located above the semiconductor layer SC corresponds to a gate electrode WG of the switching element.

In the third layer L3, the source line S1, the source line S2, and the contact portion PC are arranged. The source line S1 is located above a portion of the semiconductor layer and extends in the second direction Y. In the source line S1, a region which contacts the semiconductor layer SC corresponds to a source electrode WS of the switching element. That is, the source electrode WS is in contact with the source region SCS through a contact hole which penetrates the first insulating film 11 and the second insulating film 12. The contact portion PC is located above the auxiliary capacitance line C1 so as to extend toward the inside of the pixel beyond the auxiliary capacitance line C1. The contact portion PC corresponds to the drain electrode of the switching element. That is, the contact portion PC is in contact with the drain region SCD through the contact hole which penetrates the first insulating film 11 and the second insulating film 12.

In the fourth layer L4, the first main-common electrode CAL1, the first main-common electrode CAR1, and the sub-common electrode CB are arranged. The first main-common electrode CAL1 is located inside of the pixel PX rather than above the source line S1. The first main-common electrode CAR1 is located inside of the pixel PX rather than above the source line S2. The sub-common electrode CB is located above the gate line G1.

In the fifth layer L5, the second main-common electrode CAL2, the second main-common electrode CAR2, and the pixel electrode PE are arranged. The second main-common electrode CAL2 is located above the source line S1. The second main-common electrode CAR2 is located above the source line S2. The main pixel electrode PA of the pixel electrode PE intersects the sub-common electrode CB interposing the fourth insulating film 14. The first sub-pixel electrode PB1 is located above the contact portion PC, and in contact with the contact portion PC through the contact hole which penetrates the fourth insulating film 14. The second sub-pixel electrode PB2 is located above the auxiliary capacitance line C2.

Figure 4A:
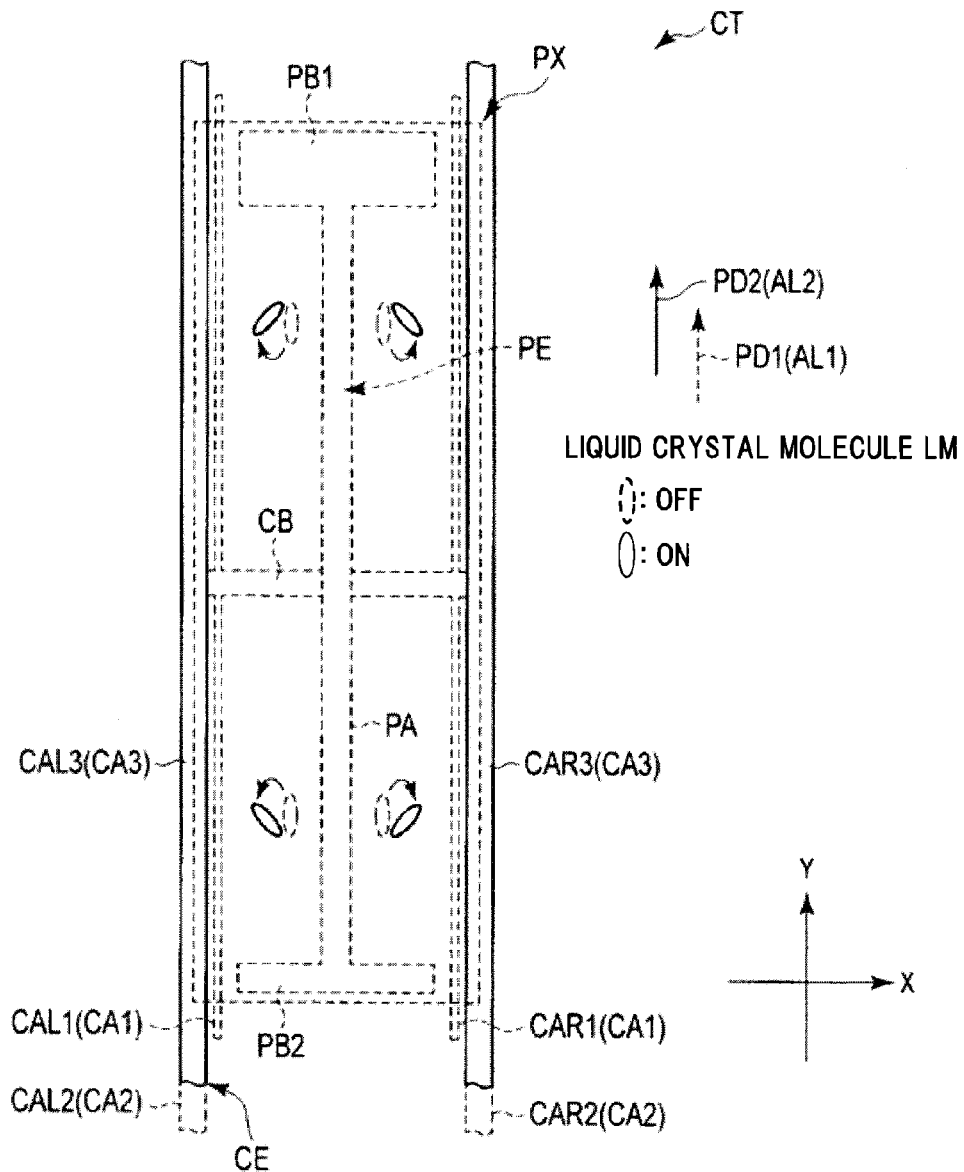
FIG. 4A is a plan view schematically showing a structure of one pixel PX in the counter substrate CT shown in FIG. 1.

FIG. 4A is a plan view schematically showing a structure of one pixel PX in the counter substrate CT shown in FIG. 1. Here, the plan view in a X-Y plane is shown. In addition, only composition required for explanation is illustrated, and a dashed line shows portions of the pixel electrodes PE and the common electrodes CE which are principal portions of the array substrate.

The counter substrate CT is equipped with a third main-common electrode CA3 which is a portion of the common electrodes CE. The third main-common electrode CA3 is electrically connected with the electric power supply portion VS outside of the active area in the array substrate, or electrically connected with the first main-common electrode CA1 formed in the array substrate AR. Thereby, the third main-common electrode CA3 is set to substantially the same common potential as the first main-common electrode CA1, etc.

The third main-common electrode CA3 is located on the both sides sandwiching the pixel electrode PE in the X-Y plane, and linearly extends in the second direction Y. The third main-common electrode CA3 is located above the second main-common electrode CA2. The third main-common electrode CA3 is formed in a stripe shape with substantially the same width in the first direction X.

In this embodiment, the third main-common electrode CA3 is arranged in two parallel lines at intervals in the first direction X. The third main-common electrode CA3 includes a third main-common electrode CAL3 striding over a boundary between the illustrated pixel PX and a pixel adjoining in the left-hand side end of the illustrated pixel PX, and a third main-common electrode CAR3 striding over a boundary between the illustrated pixel PX and a pixel adjoining in the right-hand side end of the illustrated pixel PX. The third main-common electrode CAL3 counters with the second main-common electrode CAL2. The third main-common electrode CAR3 counters with the second main-common electrode CAR2.

In addition, the common electrode CE may include a second sub-common electrode connected with the third main common-electrode CA3 so as to face the sub-common electrode CB.

In the counter substrate CT, the third main-common electrode CA3 is covered with a second alignment film AL2. In the second alignment film AL2, alignment treatment is made along with a second alignment treatment direction PD2 to make the liquid crystal molecule of the liquid crystal layer LQ initial alignment. Here, the alignment treatment is performed by rubbing treatment, optical alignment treatment, etc., for example. The second alignment treatment direction PD2 is in parallel to the first alignment treatment direction PD1, and the same direction as the first alignment treatment direction PD1 in this embodiment. In addition, the first alignment treatment direction PD1 and the second alignment treatment direction PD2 may be opposite directions each other, or may be the opposite directions to the directions shown in the Figure while they are the same directions each other, i.e., the direction from the first sub-pixel electrode PB1 to the second sub-pixel electrode PB2.

Figure 5:
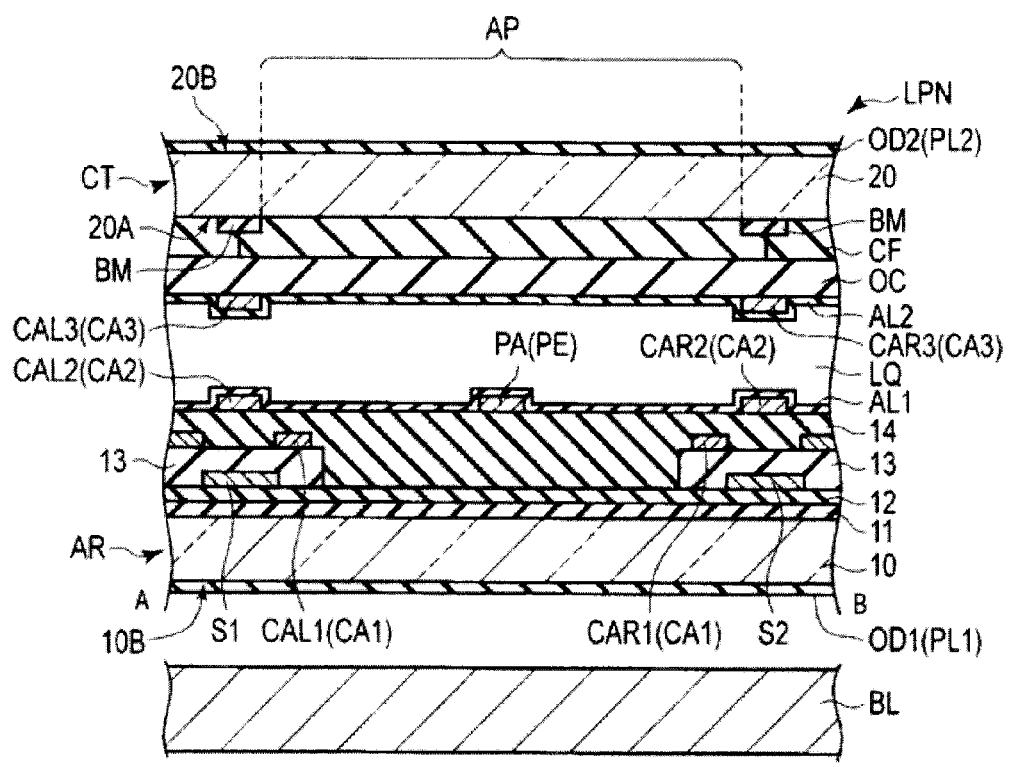
FIG. 5 is a cross-sectional view schematically showing the structure of the liquid crystal display panel LPN taken along line A-B shown in FIG. 2.
Figure 6:
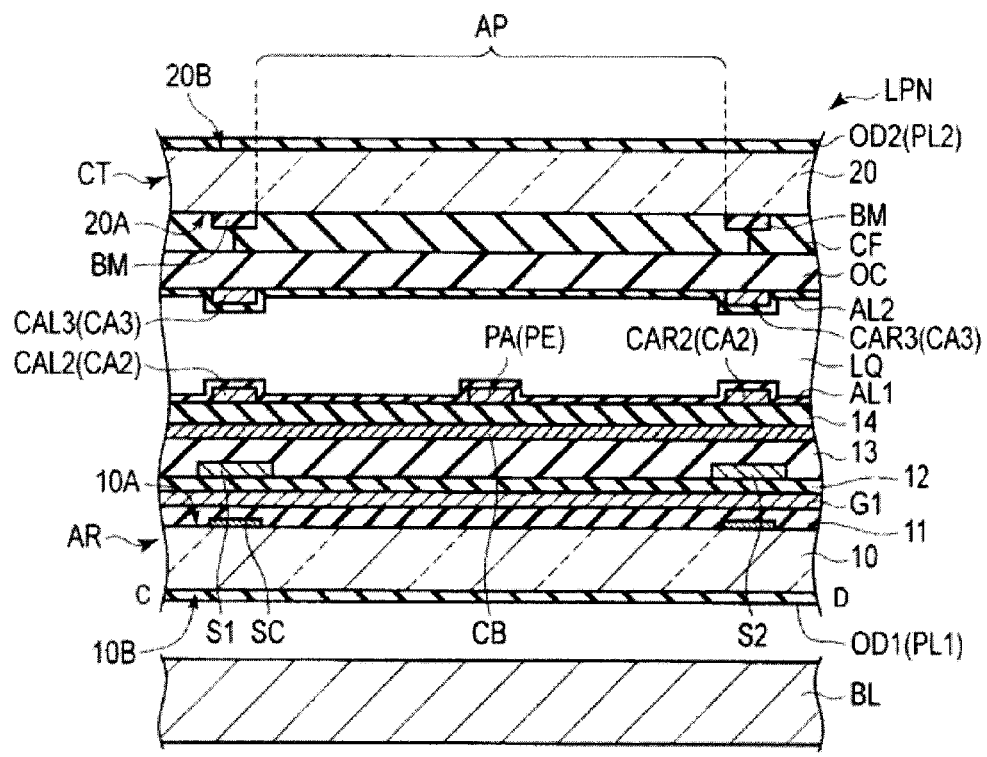
FIG. 6 is a cross-sectional view schematically showing the structure of the liquid crystal display panel LPN taken along line C-D shown in FIG. 2.
Figure 7:
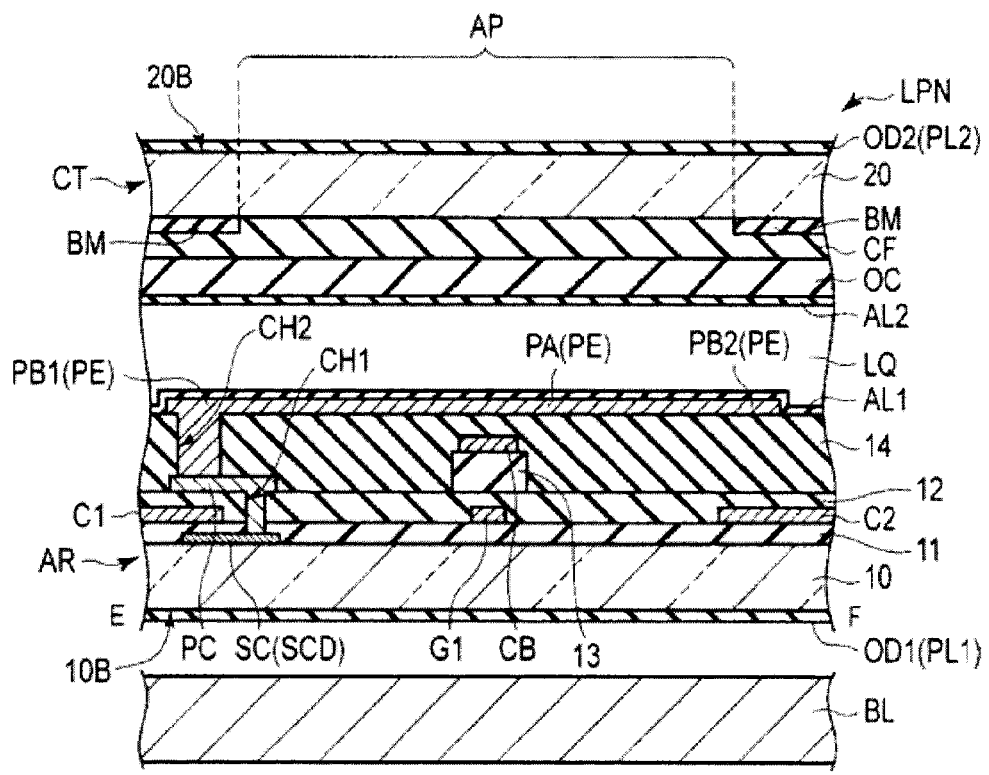
FIG. 7 is a cross-sectional view schematically showing the structure of the liquid crystal display panel LPN taken along line E-F shown in FIG. 2.

FIG. 5 is a cross-sectional view schematically showing the structure of the liquid crystal display panel LPN taken along line A-B shown in FIG. 2. FIG. 6 is a cross-sectional view schematically showing the structure of the liquid crystal display panel LPN taken along line C-D shown in FIG. 2. FIG. 7 is a cross-sectional view schematically showing the structure of the liquid crystal display panel LPN taken along line E-F shown in FIG. 2.

A backlight BL is arranged on the back side of the array substrate AR in the illustrated example. Various types of backlights BL can be used. For example, a light emitting diode (LED) or a cold cathode fluorescent lamp (CCFL), etc., can be applied as a light source of the backlight BL. In addition, the explanation about its detailed structure is omitted.

The array substrate AR is formed using a first transparent insulating substrate 10. The array substrate AR includes a semiconductor layer SC formed of poly-silicon of the switching element, the gate line G1, the auxiliary capacitance line C1, the auxiliary capacitance line C2, the source line S1, the source line S2, the pixel electrode PE, the first main-common electrode CA1, the second main-common electrode CA2, the first insulating film 11, the second insulating film 12, the third insulating film 13, the fourth insulating film 14, and the first alignment AL1, etc., in an inside surface of the first transparent insulating substrate 10 facing the counter substrate CT.

The semiconductor layer SC is formed between the first insulating substrate 10 and the first insulating film 11. The auxiliary capacitance line C1, the auxiliary capacitance line C2, and the gate line G1 are formed on the first insulating film 11, and covered with the second insulating film 12. The auxiliary capacitance lines C1, the auxiliary capacitance line C2, and the gate line G1 can be formed simultaneously by the same line material.

The source line S1, the source line S2, and the contact portion PC are formed on the second insulating film 12. The source line S1, the source line S2 and the contact portion PC may be simultaneously formed of the same line materials. The contact portion PC is in contact with the drain region SCD of the semiconductor layer SC through a contact hole CH1 penetrating the first insulating film 11 and the second insulating film 12.

The source line S1 and source line S2 are covered with the third insulating film 13 as shown in FIGS. 5 and 6. The third insulating film 13 is also arranged on the second insulating film 12 on the gate line G1 as shown in FIGS. 6 and 7. On the other hand, the third insulating film 13 exposes the second insulating film 12 in the contact portion PC and its circumference as shown in FIG. 7. Furthermore, while the third insulating film 13 is arranged on the each gate line G, the third insulating film 13 exposes the second insulating film 12 between the adjacent gate lines G. Therefore, the third insulating film 13 is neither arranged on the auxiliary capacitance line C nor covers the contact portion PC located in a circumference of the auxiliary capacitance line C.

The first main-common electrode CA1 and the sub-common electrode CB are formed on the third insulating film 13, and covered with the fourth insulating film 14. The first main-common electrode CA1 and the sub-common electrode CB are formed of transparent electric conductive materials, such as Indium Tin Oxide (ITO) and Indium Zinc Oxide (IZO), for example. The first main-common electrode CAL1 is located inside of the pixel PX rather than on the source line S1. The first main-common electrode CAL2 is located inside of the pixel rather than on the source line S2. The second insulating film 12 and the third insulating film 13 are interposed between the gate line G1 and the sub-common electrode CB. The third insulation film 13 is interposed between the source lines S1, S2 and the first common electrode CA1, and between the source lines S1, S2 and the sub-common electrode CB. That is, the third insulating film 13 corresponds to an interlayer insulating film to isolate between the source lines S1, S2 and the first common electrode CA1, and between the source lines S1, S2 and the sub-common electrode CB.

While the fourth insulating film 14 covers the partly formed third insulating film 13, the fourth insulating film 14 covers the contact portion PC and the second insulation film 12 exposed from the third insulating film 13. In the fourth insulating film 14, a contact hole CH2 penetrating to the contact portion PC is formed. The fourth insulating film 14 is formed of a transparent resin material, for example. The fourth insulating film 14 eases level difference among the various lines and electrodes located under insulating film, and its surface is made approximately flat.

The main pixel electrode PA of the pixel electrode PE, the first sub-pixel electrode PB1, and the second sub-pixel electrode PB2 are formed on the fourth insulating film 14, and covered with the first alignment film ALL In the pixel electrode PE, the first sub-pixel electrode PB1 is located on the auxiliary capacitance line C1 or the contact portion PC, and contacts the contact portion PC through the contact hole CH2. The second sub-pixel electrode PB2 is located on the auxiliary capacitance line C2.

Moreover, the second main-common electrode CA2 is formed on the fourth insulating film 14 apart from the pixel electrode PE, and covered with the first alignment film AL1. The second main-common electrode CAL2 is located on the source line S1, and the second main-common electrode CAR2 is located on the source line S2. The pixel electrode PE and the second main-common electrode CA2 can be formed simultaneously by the same material, and may be formed of transparent electric conductive materials, such as ITO and IZO, or other opaque wiring materials, such as aluminum (Al), titanium (Ti), silver (Ag), molybdenum (Mo), tungsten (W), copper (Cu), and chromium (Cr).

The first alignment film AL1 is arranged on the array substrate AR facing the counter substrate CT, and extends to whole active area ACT. The first alignment film AL1 is arranged also on the fourth insulating film 14. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, a third main-common electrode CA3, and a second alignment film AL2, etc., in an internal surface of the second insulating substrate 20 facing the array substrate AR.

The black matrix BM defines each pixel PX, and forms an aperture AP facing the pixel electrode PE. That is, the black matrix BM is arranged so that line portions, i.e., the source line S, the auxiliary capacitance line C, and the switching element SW may counter the black matrix BM. Herein, the black matrix BM includes a portion located above the source lines S1 and S2 extending along the second direction Y, and a portion located above the auxiliary capacitance lines C1 and C2 extending along the first direction X, and is formed in the shape of a lattice. The black matrix BM is formed in the internal surface 20A of the second insulating substrate 20 facing the array substrate AR.

The color filter CF is arranged corresponding to each pixel PX. That is, while the color filter CF is arranged in the aperture AP defined by the black matrix in the internal surface 20A of the second insulating substrate 20, a portion thereof extends on the black matrix BM. The colors of the color filters CF arranged in adjacent pixels PX in the first direction X differ mutually. For example, the color filters CF are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjacent color filters CF is located in a position which overlaps with the black matrix BM. Furthermore, the color filter CF extends to a plurality of adjacent pixels in the second direction Y.

The overcoat layer OC covers the color filter CF. The overcoat layer OC eases influence of concave-convex of the surfaces of the color filter CF and the black matrix BM. The overcoat layer OC is formed of a transparent resin material, for example.

The third main-common electrode CA3 is formed on the overcoat layer OC facing the array substrate AR, and located under the black matrix BM. The second main-common electrode CAL2 is located under the third main-common electrode CAL3. The second main-common electrode CAR2 is located under the third main-common electrode CAR3. In the above-mentioned aperture AP, the domain between the pixel electrode PE and the second and third main-common electrodes CA2 and CA3 correspond to a transmissive domain which penetrates the backlight since other electrodes and wirings are not formed except for the region in which the sub-common electrode CB crosses the gate line G1.

The second alignment film AL2 is arranged on the counter substrate CT facing the array substrate AR, and extends to whole active area ACT. The second alignment film AL2 covers the third main-common electrode CA3, the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed. The cell gap is smaller than the distance between the main pixel electrode PA and the first main-common electrode CAL. The array substrate AR and the counter substrate CT are pasted together by seal material arranged in a circumference of the active area, which is not illustrated, while the predetermined cell gap is formed, for example.

The liquid crystal layer LQ is held in a cell gap formed between the array substrate AR and the counter substrate CT, i.e., between the first alignment film AL1 and the second alignment film AL2. The liquid crystal layer LQ contains the liquid crystal molecules LM. For example, the liquid crystal layer LQ is formed of liquid crystal material whose dielectric anisotropy is positive (posi-type).

A first optical element OD1 is attached on an external surface 10B of the array substrate AR, i.e., the external surface of the first insulating substrate 10 which forms the array substrate AR by adhesives, etc. The first optical element OD1 is located on a side which counters with the backlight unit BL of the liquid crystal display panel LPN, and controls the polarization state of the incident light which enters into the liquid crystal display panel LPN from the backlight unit BL. The first optical element OD1 includes a first polarization plate PL1 having a first polarizing axis AX1. Other optical elements such as retardation film may be arranged between the first polarization plate PL1 and the first insulating substrate 10.

A second optical element OD2 is attached on an external surface 20B of the counter substrate CT, i.e., the external surface of the second insulating substrate 20 which forms the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as retardation film may be arranged between the second polarization plate PL2 and the second insulating substrate 20. The first polarizing axis AX1 of the first polarization plate PL1 and the second polarizing axis AX2 of the second polarization plate PL2 are arranged in the Crossed Nichol state in which they substantially intersects perpendicularly.

Next, operation of the liquid crystal display panel LPN of the above-mentioned structure is explained.

Figures 4B, 4C:
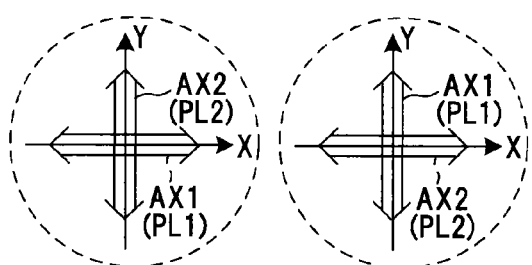
FIGS. 4B and 4C are figures showing alignment axes.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in parallel with the second direction Y as shown with a dashed line in FIG. 4. In this state, the time of OFF corresponds to the initial alignment state, and the alignment direction of the liquid crystal molecule LM at the time OFF, i.e., the second direction Y corresponds to the initial alignment direction.

At the time of OFF, a portion of the backlight from the backlight BL penetrates the first polarization plate PL1, and enters into the liquid crystal display panel LPN. The backlight which entered into the liquid crystal display panel LPN is linearly polarized light which intersects perpendicularly with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Crossed Nichol positional relationship with the first polarization plate PL1 (black display).

On the other hand, in case the potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes. That is, the long axes of the liquid crystal molecules rotate in the plane substantially in parallel to the X-Y plane. Thereby, transmissive regions in which the backlight can penetrate are formed between the pixel electrode PE and the common electrode CE.

In the embodiment shown in FIG. 4A, in the upper half region between the pixel electrode PE and the third main-common electrode CAL3 in the pixel PX, electric field is formed among the main pixel electrode PA, the first sub-pixel electrode PB1 and the second main-common electrode CAL2, and among the main pixel electrode PA, the first sub-pixel electrode PB1 and the third main-common electrode CAL3, respectively. Accordingly, the liquid crystal molecule LM mainly rotates clockwise to the second direction Y, and turns to the lower left in the figure. Furthermore, in the lower half region of the pixel PX, the electric field is formed among the main pixel electrode PA, the second sub-pixel electrode PB2 and the second main-common electrode CAL2, and among the main pixel electrode PA, the second sub-pixel electrode PB2 and the third main-common electrode CAL3, respectively. Accordingly, the liquid crystal molecule LM mainly rotates counterclockwise to the second direction Y, and turns to the upper left in the figure.

In the upper half region between the pixel electrode PE and the third main-common electrode CAR3 in the pixel PX, electric field is formed among the main pixel electrode PA, the first sub-pixel electrode PB1 and the second main-common electrode CAR2, and among the main pixel electrode PA, the first sub-pixel electrode PB1 and the third main-common electrode CAR3, respectively. Accordingly, the liquid crystal molecule LM mainly rotates counterclockwise to the second direction Y, and turns to the lower light in the figure. Furthermore, in the lower half region of the pixel PX, the electric field is formed among the main pixel electrode PA, the second sub-pixel electrode PB2 and the second main-common electrode CAR2, and among the main pixel electrode PA, the second sub-pixel electrode PB2 and the third main-common electrode CAR3, respectively. Accordingly, the liquid crystal molecule LM mainly rotates clockwise to the second direction Y, and turns to the upper right in the figure.

Thus, in each pixel PX, at the time when the electric field is formed between the pixel electrode PE and the common electrode CE, the alignment direction of the liquid crystal molecule is divided into a plurality of directions with respect to the region in which the pixel electrode PE and the sub-common electrode CB overlap each other, and domains are formed corresponding to each direction. That is, a plurality of domains is formed in each pixel PX.

At the time of ON, the linearly polarized light which intersects perpendicularly with the first polarizing axis AX1 of the first polarization plate PL1 enters into the liquid crystal display panel LPN, and the polarization state changes when passing the liquid crystal layer LQ in accordance with the alignment state of the liquid crystal molecule LM. For this reason, at the time of ON, at least a portion of the backlight which passed the liquid crystal layer LQ penetrates the second polarization plate PL2 (white display).

In this embodiment, while the third insulating film 13 covers the source line S, the third insulating film 13 exposes the contact portion PC in contact with the semiconductor layer SC and the second insulating film 12 in the circumference of the contact portion PC. For this reason, comparing with an example which covers the contact portion PC with the third insulating film 13, it becomes unnecessary to form the contact hole which penetrates the contact portion PC in the third insulating film 13, and the electric connection between the contact portion PC and the pixel electrode PE is attained through a contact hole CH2 formed in the fourth insulating film 14. For this reason, the number of masking processes is reduced, and total masking shift is reduced. Accordingly, it becomes possible to reduce the area of the contact portion PC which overlaps with the auxiliary capacitance line C1 and extends toward the gate line G1 than the comparative example. Furthermore, it becomes possible to expand the transmissive area and to improve the transmissivity in one pixel.

Moreover, according to this embodiment, since the first sub-common electrode CB is arranged so as to overlap with the gate line G, undesirable leaked electric field from the gate line G can be shielded. The sub-common electrode CB functions as a gate shield electrode. Therefore, the influence by undesirable electric field in the region close to the gate line G is eased in the transmissive region, and it becomes possible to control degradation of display grace due to burn-in phenomenon.

Moreover, according to this embodiment, the array substrate AR includes two layers of main-common electrodes (the first main-common electrode CA1 and the second main-common electrode CA2) facing the liquid crystal layer LQ in the circumference of each source line S, to which the same potential, i.e., the common potential is applied. The first main-common electrode CA1 in a lower layer is arranged inside of the pixel rather than on the source line S. The second main-common electrode CA2 in the upper layer is located right above the source line S2. Since the first main-common electrode CA1 and the second main-common electrode CA2 are set to the same potential, an equipotential surface is formed therebetween. The equipotential surface shields undesirable leaked electric field which directs to the liquid crystal layer LQ from the source line S arranged in the lower layer. That is, the first main-common electrode CA1 and the second main-common electrode CA2 can shield undesirable leaked electric field from the source line S, and can function as a source shield electrode. Thus, the influence of the leaked electric field from the source line S which adjoins the pixel electrode PE can be eased, and it becomes possible to control degradation of the display grace by a cross talk.

Moreover, while horizontal electric field (or oblique electric field) required to control the alignment of the liquid crystal molecule between the main pixel electrode PA and the second main-common electrode CA2, and between the main pixel electrode PA and the third main-common electrode CA3 is formed at the time of ON in this embodiment, fringe electric field is also formed between the main pixel electrode PA and the sub-common electrode CB. In the X-Y plane, the fringe electric field is substantially in parallel to the above horizontal electric field. For this reason, it becomes possible to control alignment disorder of the liquid crystal molecule LM near the gate line G, i.e., in the circumference of the sub-common electrode CB. Thereby, it becomes possible to improve transmissivity in the circumference of the gate line G, and also to improve the transmissivity in each pixel.

When the fringe electric field acts on the liquid crystal molecule, the alignment of the liquid crystal molecule is disordered, and it may become impossible to obtain desired transmissivity in the example explained here. However, it is possible to reduce the influence by the fringe electric field to the liquid crystal layer by making large the thickness of the fourth insulating film 14 formed of a transparent resin material. For example, when forming the fourth insulating film 14 with the resin material, since it is preferable to form the fourth insulating film 14 with approximately 1 μm thickness, it becomes possible to raise more manufacturing yield than the case in which the fourth insulating film 14 is formed of the transparent non-organic materials.

Moreover, in this embodiment, while the first main-common electrode CA1 is located in the region facing the aperture AP (transmissive region), the first main-common electrode CA1 is formed of a transparent electric conductive material. At the time of ON, the liquid crystal molecule LM located right above the first main-common electrode CA1 is alignment controlled between the pixel electrode PE and the second main-common electrode CA2, and between the pixel electrode PE and the third main-common electrode CA3. Accordingly, the liquid crystal molecules LM above the first main-common electrode CA1 also contribute to the display. That is, in this embodiment, while the first main-common electrode CA1 is arranged in the aperture AP, the fall of the transmissivity in the aperture AP is not resulted and high transmissivity is achieved.

At the time of ON, the liquid crystal molecule LM in the region which overlaps with the main pixel electrode PA, the second main-common electrode CA2 and the third main-common electrode CA3 maintains the same initial alignment state as the time of OFF (or the time of a black display) even at the time ON, and does not contribute to the display. For this reason, in case electrode widths of the second main-common electrode CA2 and the third main-common electrode CA3 are formed so as to be larger than the line width of the source line S, the region which runs off from the source line S does not contribute to the display. On the other hand, according to this embodiment, since the electrode widths of the second main-common electrode CA2 and the third main-common electrode CA3 are made smaller than the line width of source line S, it becomes possible to expand the region in which the alignment of the liquid crystal molecule LM is controlled.

Moreover, according to this embodiment, the first main-common electrode CA1 near the source line S is arranged in the position which is shifted from the region above the source line S. For this reason, it becomes possible to control formation of the undesirable capacitance between the source line S and the first main-common electrode CA1, and also to reduce the power consumption of the liquid crystal display device. Moreover, since the second main-common electrode CA2 facing the source line S is located more apart from the source line S than the first main-common electrode CAL and has line width smaller than the source line S, it becomes possible to reduce the influence to the display by the capacitance formed therebetween.

Moreover, the liquid crystal molecule LM in the region which overlaps with the second main-common electrode CA2 located right above the source line S or the region which overlaps with the third main-common electrode CA3 located under the black matrix BM maintains the initial alignments state even at the time of ON. For this reason, even if assembling shift arises between the array substrate AR and the counter substrate CT, the leakage of undesirable electric field to the adjoining pixel can be controlled. Therefore, even if it is a case where the colors of color filter CF differ between the adjoining pixels, it becomes possible to control generating of mixed colors. Moreover, even if it is a case where the liquid crystal display panel is observed from an oblique direction, since the backlight does not penetrate the region which overlaps with the second main-common electrode CA2 or the third main-common electrode CA3, it becomes possible to control generating of mixed colors.

Moreover, according to this embodiment, it becomes possible to form a plurality of domains in one pixel. For this reason, a viewing angle can be optically compensated in the plurality of directions, and wide viewing angle can be attained.

Next, a modification of above embodiment is explained. Hereinafter, the main differences from the above embodiment are explained. The same referential marks are attached to the same elements as the above embodiment, and detailed explanation is omitted.

Figure 8:
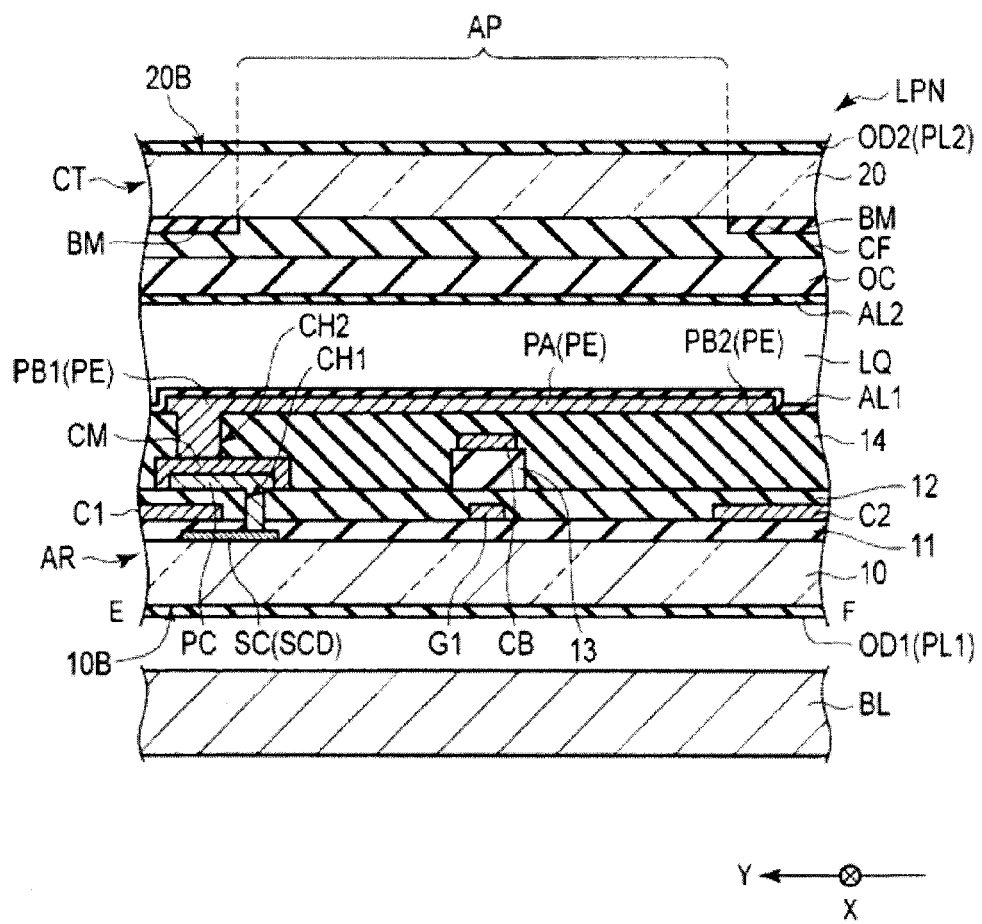
FIG. 8 is a cross-sectional view schematically showing a modified structure of the liquid crystal display panel LPN taken along line E-F shown in FIG. 2.

FIG. 8 is a cross-sectional view schematically showing a modified structure of the liquid crystal display panel LPN taken along line E-F shown in FIG. 2.

The modification shown in FIG. 8 is different from the embodiment shown in FIG. 7 in a point that the array substrate AR is equipped with a cover element CM which covers the contact portion PC. Since other structures are the same as those of the embodiment shown in FIG. 7, detailed explanation is omitted.

The cover element CM covers substantially the whole of the contact portion PC exposed from the third insulating film 13, and is also arranged on the second insulating film 12 in the circumference of the contact portion PC. The cover element CM is covered with the fourth insulating film 14. The contact hole CH2 penetrating to the cover component CM is formed in the fourth insulating film 14. In the pixel electrode PE, the first sub-pixel electrode PB1 is located on the auxiliary capacitance line C1 and the cover element CM, and in contact with the cover element CM through the contact hole CH2. The cover element CM can be formed by the same material as the first main-common electrode CA1 and the sub-common electrode CB, i.e., a transparent electric conductive material.

In this modification, since the cover element CM is formed of a transparent electric conductive material, even if the cover element CM is formed extending from the contact portion PC to the transmissive region, the liquid crystal molecule located right above the extended cover element CM is controlled by electric field between the pixel electrode PE and the second and third main-common electrodes CA2 and CA3. Accordingly, the domain right above the extended cover element CM formed of the transparent electric conductive material contributes to the display and does not cause reduction in the transmissivity in the transmissive region.

Figure 9:
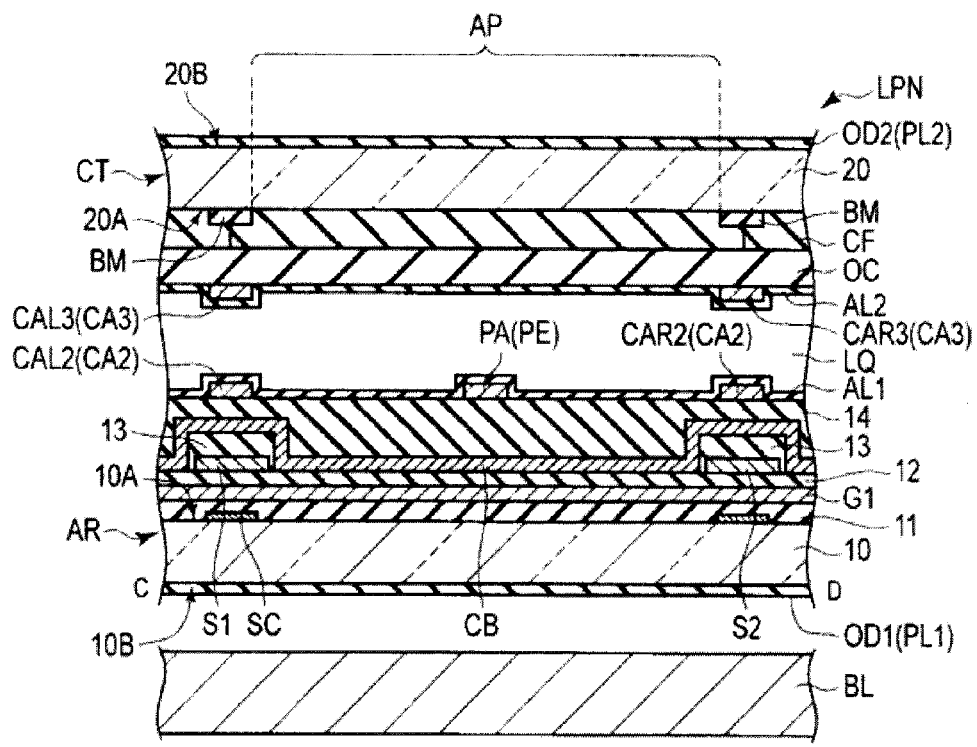
FIG. 9 is a cross-sectional view schematically showing a modified structure of the liquid crystal display panel LPN taken along line C-D shown in FIG. 2.

FIG. 9 is a cross-sectional view schematically showing a modified structure of the liquid crystal display panel LPN taken along line C-D shown in FIG. 2.

The modification shown in FIG. 9 is different from the embodiment shown in FIG. 6 in a point that the third insulating film 13 exposes the second insulating film between 12 the adjacent source line S1 and second source line S2, and that the sub-common electrode CB is formed on the exposed second insulating film 12 between the adjacent source line S1 and second source line S2. Since other structures are the same as those of the embodiment shown in FIG. 7, detailed explanation is omitted.

The third insulating film 13 covers the source line S1 and the source line S2, respectively and extends in the second direction Y. While the sub-common electrode CB is formed on the third insulating film 13 in the position in which the sub-common CB intersects the source line S1 and the source line S2, the sub-common electrode CB is formed on the second insulating film 12 in the region between the source line S1 and the source line S2, and covered with the fourth insulating film 14. The sub-common electrode CB counters the gate line G1 interposing the second insulating film 12 between the source line S1 and the source line S2.

In this modification, since the sub-common electrode CB counters with the gate line G1 interposing the second insulating film 12 between the source line S1 and the source line S2, like the embodiment shown in FIG. 6, it becomes possible to make the sub-common electrode CB more close to the gate line G1 as compared with the embodiment in which the second insulating film 12 and the third insulating film 13 intervene between the sub-common electrode CB and the gate line G1. Therefore, it becomes possible to ease more the influence by leaked electric field from the gate line G1 by the sub-common electrode CB.

Figure 10:
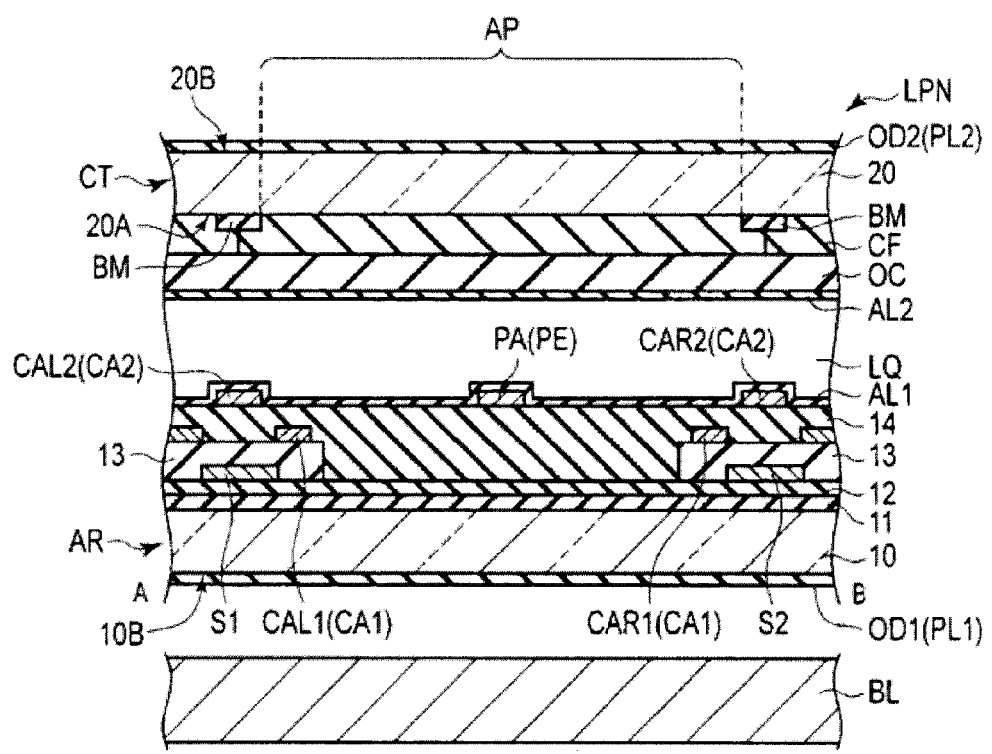
FIG. 10 is a cross-sectional view schematically showing a modified structure of the liquid crystal display panel LPN taken along line A-B shown in FIG. 2.

FIG. 10 is a cross-sectional view schematically showing a modified structure of the liquid crystal display panel LPN taken along line A-B shown in FIG. 2.

Since the modification shown in FIG. 10 is different from the above embodiment shown in FIG. 5 in a point that the counter substrate CT is not equipped with the third common electrode, and other structures are the same as those of the embodiment shown in FIG. 5, detailed explanation is omitted.

In the counter substrate CT, substantially the whole surface of the overcoat layer OC facing the array substrate AR is covered with the second alignment film AL2.

According to this modification, the liquid crystal molecules in the transmissive region are alignment controlled by the electric field generated between the pixel electrode PE and the second main-common electrode CA2.

Also, in this modification, same effect as the above embodiment is obtained.

Figure 11:
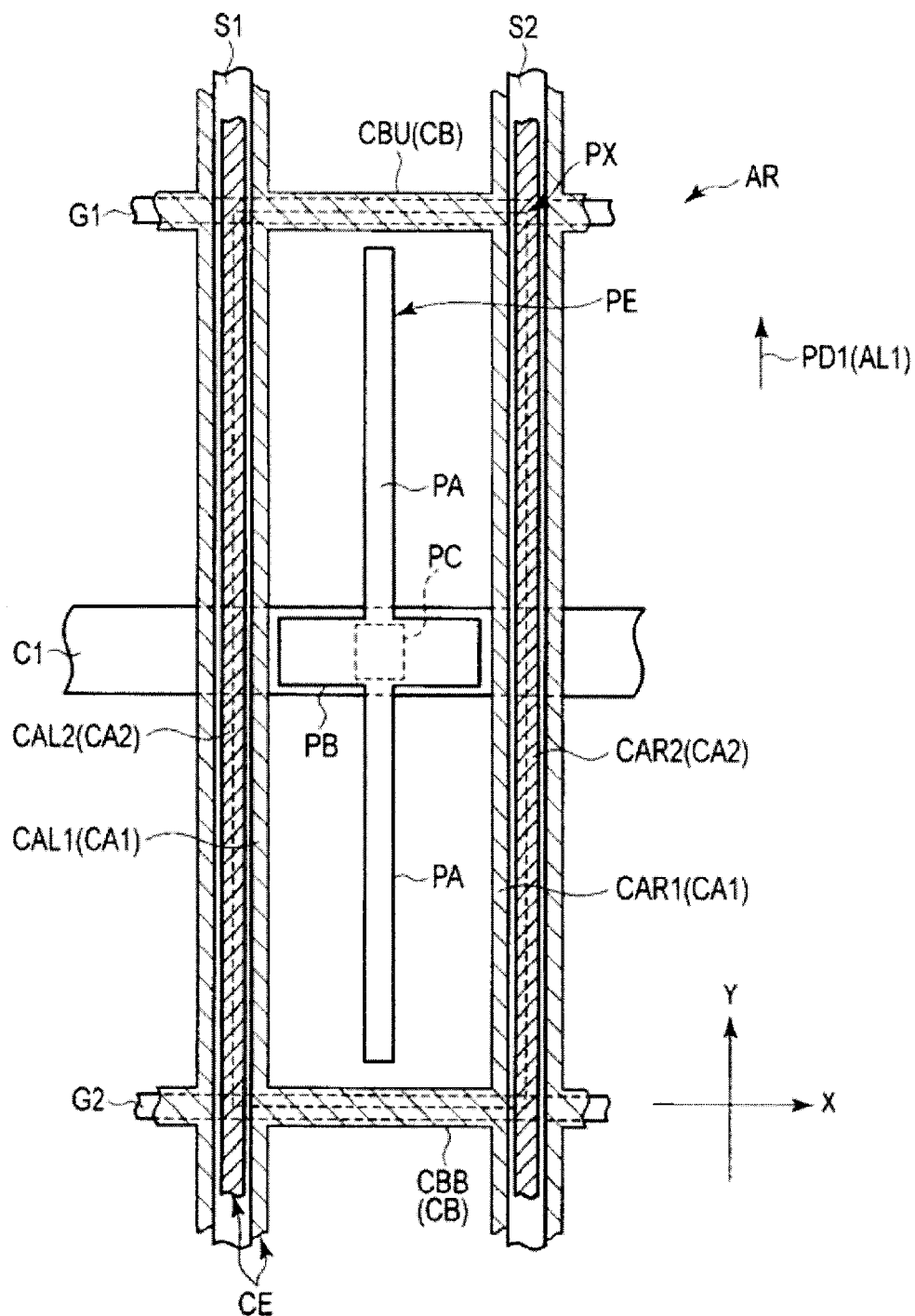
FIG. 11 is a plan view schematically showing a structure of one pixel PX when the array substrate AR shown in FIG. 1 is seen from the counter substrate side according to other embodiment.

FIG. 11 is a plan view schematically showing a structure of one pixel when the array substrate AR shown in FIG. 1 is seen from a counter substrate side according to other embodiment.

The embodiment shown in FIG. 11 is different from the embodiment shown in FIG. 2 in a point that each pixel PX is defined with the gate line G1, the gate line G2, the source line S1 and the source line S2, and also that the pixel electrode PE is formed in the shape of a cross.

In the illustrated pixel PX, the gate line G1 is arranged in an upper end portion of the pixel PX so as to stride over a boundary between the illustrated pixel PX and an adjoining pixel PX on its upper end side. The gate line G2 is arranged in a bottom end portion of the pixel PX striding over a boundary between the illustrated pixel PX and an adjoining pixel PX on its bottom end side. The auxiliary capacitance line C1 is arranged approximately in the central portion of the pixel PX.

The pixel electrode PE is equipped with the main pixel electrode PA and the sub-pixel electrode PB. The main pixel electrode PA and the sub-pixel electrode PB are formed integrally or continuously. The main pixel electrode PA is located between the source line S1 and the source line S2, and linearly extends along the second direction Y to near the upper end portion and the bottom end portion of the pixel PX. Between the source line S1 and the source line S2, the sub-pixel electrode PB linearly extends along the first direction X. The sub-pixel electrode PB overlaps with the auxiliary capacitance line C1, and is connected with an approximately center of the main pixel electrode PA. Furthermore, the sub-pixel electrode PB extends toward the source line S1 and the source line S2. At least a portion of the sub-pixel electrode PB overlaps with the contact portion PC, and is electrically connected with the contact portion PC.

A sub-common electrode CB of the common electrode CE is formed with the first main-common electrode CA1 integrally or continuously. In the illustrated embodiment, the sub-common electrode CB is arranged in two parallel lines with interval therebetween in the second direction Y. That is, the sub-common electrode CB is equipped with a sub-common electrode CBU located in the upper end portion, and a sub-common electrode CBB located in the bottom end portion of the pixel PX. The sub-common electrode CBU counters the gate line G1. The sub-common electrode CBB counters the gate line G2.

The array substrate AR having above structure can be combined with the counter substrates CT shown in FIG. 4, and the counter substrate CT (the counter substrate which is not equipped with the third common electrodes) shown in FIG. 10.

Also, in this embodiment, same effect as above embodiment is obtained. Moreover, since one sub-pixel electrode of the pixel electrode overlaps with one auxiliary capacitance line, as compared with the embodiment shown in FIG. 2, it becomes possible to reduce the width of the auxiliary capacitance line. Furthermore, it becomes possible to form the contact portion PC in the position which overlaps with the auxiliary capacitance line, and to reduce the protruded area from the auxiliary capacitance line. Therefore, as compared with the embodiment shown in FIG. 2, it becomes possible to further expand the area of the transmissive region in one pixel, and to improve transmissivity.

Figure 12:
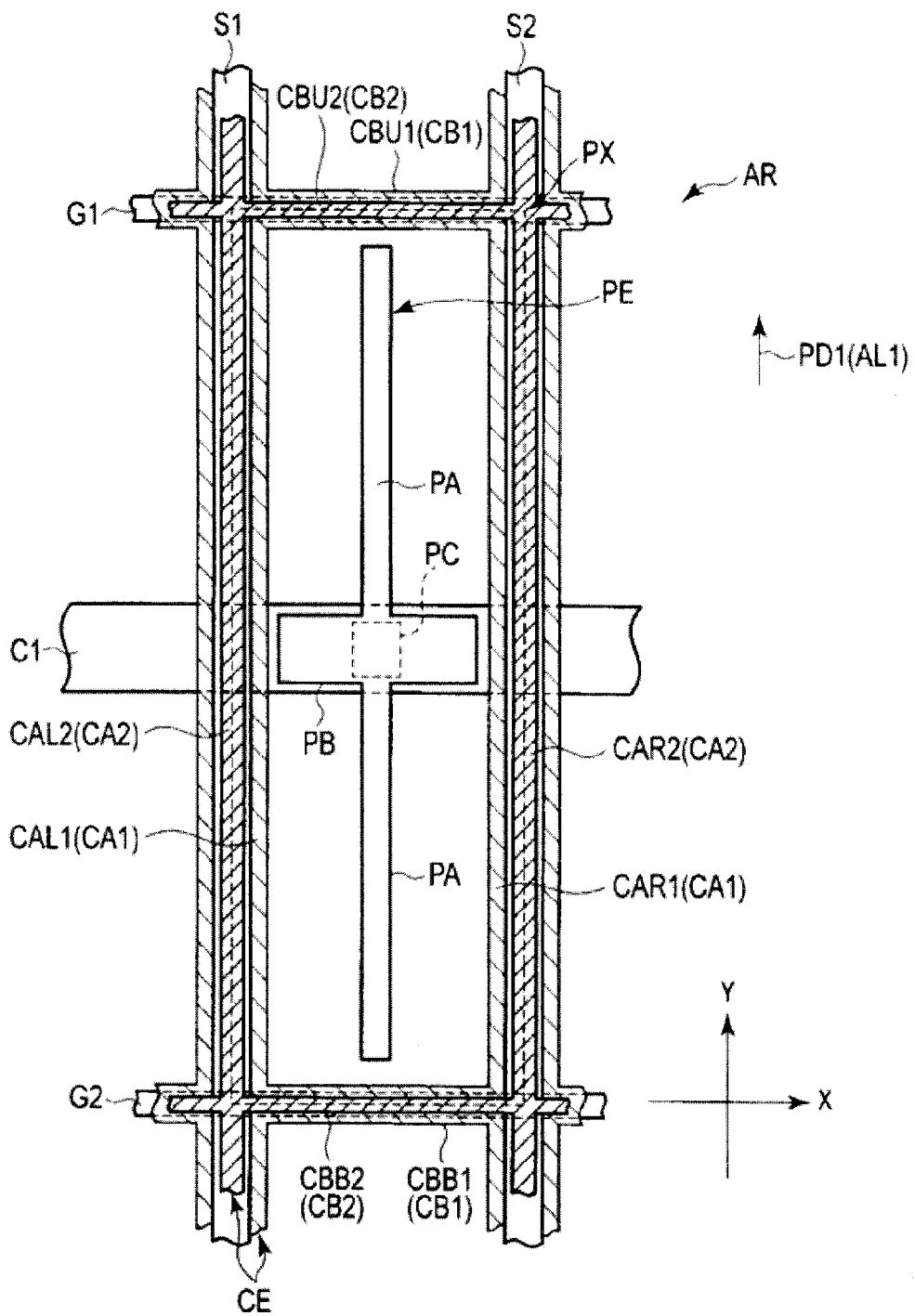
FIG. 12 is a plan view schematically showing a structure of one pixel PX when the array substrate AR shown in FIG. 1 is seen from the counter substrate side according to other embodiment.

FIG. 12 is a plan view schematically showing the structure of one pixel when the array substrate AR shown in FIG. 1 is seen from the counter substrate side according to other embodiment.

The embodiment shown in FIG. 12 is different from the embodiment shown in FIG. 11 in a point that the common electrode CE includes a first sub-common electrode CB1 and a second sub-common electrode CB2 in addition to the first main-common electrode CA1 and the second main-common electrode CA2.

The first sub-common electrode CB1 is formed with the first main-common electrode CA1 integrally and continuously. In the illustrated embodiment, the first sub-common electrode CB1 is arranged in two parallel lines with interval therebetween in the second direction Y. That is, the sub-common electrode CB1 includes a first sub-common electrode CBU1 located in the upper end portion of the pixel PX, and a first sub-common electrode CBB1 located in the bottom end portion of the pixel PX. The first sub-common electrode CBU1 counters the gate line G1. The first sub-common electrode CBB1 counters the gate line G2.

The second sub-common electrode CB2 is formed with the second main-common electrode CA2 integrally and continuously. In the illustrated example, the second sub-common electrode CB2 is arranged in two parallel lines with interval in the second direction Y. That is, the second sub-common electrode CB2 includes a second sub-common electrode CBU2 located in the upper end portion of the pixel PX, and a second sub-common electrode CBB2 located in the bottom end portion of the pixel PX. The second sub-common electrode CBU2 counters the first sub-common electrode CBU1. The second sub-common electrode CBB2 counters the first sub-common electrode CBB1. That is, the pixel electrode PE is surrounded with the second main-common electrode CA2 and the second sub-common electrode CB2 formed in the same level layer, respectively.

The array substrate AR having above structure can be combined with the counter substrates CT shown in FIG. 4, and the counter substrate CT (the counter substrate which is not equipped with the third common electrode) shown in FIG. 10.

According to this embodiment, same effect as other embodiment is obtained. In addition, since the pixel electrode PE is surrounded with the second main-common electrode CA2 and the second sub-common electrode CB2, it becomes possible to control the electric field leakage to the adjoining pixel.

In addition, although the above-mentioned embodiment explains about the case where the initial alignment direction of the liquid crystal molecule LM is in parallel to the second direction Y, the initial alignment direction of the liquid crystal molecule LM may be the oblique direction which obliquely crosses the second direction Y.

Moreover, in the embodiments, although the case where the liquid crystal layer LQ is formed of the liquid crystal material which has positive (positive type) dielectric constant anisotropy, the liquid crystal layer LQ may be formed of the liquid crystal material which has negative (negative type) dielectric constant anisotropy.

Moreover, in this embodiment, as long as undesirable electric field leakage from the gate line G does not influence to alignment of the liquid crystal molecule, the sub-common electrode may be omitted. Moreover, as long as the undesirable electric field leakage from the source line S does not influence to the liquid crystal molecule, the first main-common electrode may be omitted. In addition, according to this embodiment, at least one of the sub-common electrode CB and the first main-common electrode CA1 is needed, and the third insulating film 13 is needed as an interlayer insulating film between at least one of the sub-common electrode CB and first main-common electrode CA1, and the source line S. In this embodiment, it becomes possible to improve transmissivity by applying the above-mentioned third insulating film 13.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
    a first substrate including;
        a semiconductor layer,
        a first insulating film covering the semiconductor layer,
        a gate line extending in a first direction on the first insulating film,
        a second insulating film covering the gate line,
        a source line extending in a second direction orthogonally crossing the first direction on the second insulating film,
        a contact portion formed on the second insulating film, the contact portion contacting with the semiconductor layer,
        a third insulating film covering the source line and exposing the contact portion and the second insulating film in a circumference of the contact portion,
        a sub-common electrode extending in the first direction so as to face the gate line and crossing the source line on the third insulating film,
        a first main-common electrode connected with the sub-common electrode and extending along the source line in the second direction on the third insulating film,
        a fourth insulating film covering the sub-common electrode and the first main-common electrode,
        a second main-common electrode extending in the second direction on the fourth insulating film, the second main-common electrode facing the source line and being set to the same potential as the first main-common electrode,
        a pixel electrode including a main pixel electrode apart from the second main-common electrode and extending in the second direction on the fourth insulating film, the pixel electrode being electrically connected with the contact portion, and
        a first alignment film covering the second main-common electrode and the pixel electrode,
    a second substrate arranged so as to face the first substrate; and
    a liquid crystal layer held between the first substrate and the second substrate.

2. The liquid crystal display device according to claim 1, wherein
    the second substrate includes a third main-common electrode extending in the second direction so as to face the second main-common electrode and set to the same potential as the second main-common electrode, and
    a second alignment film covers the third main-common electrode.

3. The liquid crystal display device according to claim 1, wherein
    the first substrate includes a first auxiliary capacitance line and a second auxiliary capacitance line extending in the first direction, respectively, and
    the gate line is arranged between the first auxiliary capacitance line and the second auxiliary capacitance line.

4. The liquid crystal display device according to claim 3, wherein the first substrate includes;
    a first sub-pixel electrode connected with one end of the main pixel electrode and arranged on the first auxiliary capacitance line, the first sub-pixel electrode being electrically connected with the contact portion and extending in the first direction, and a second sub-pixel electrode connected with another end of the main pixel electrode and arranged on the second auxiliary capacitance line extending in the first direction.

5. The liquid crystal display device according to claim 1, wherein
the first substrate includes a cover element covering the contact portion and formed of the same material as the sub-common electrode.

6. The liquid crystal display device according to claim 5, wherein
the sub-common electrode, the first main-common electrode, and the cover element are formed of transparent conductive material.

7. The liquid crystal display device according to claim 1, wherein
the first main-common electrode is arranged on a main electrode side rather than an overlapping region with the source line, and
the second main-common electrode has a smaller width than the width of the source line and is arranged in an overlapping region with the source line.

8. The liquid crystal display device according to claim 1, wherein
the third insulating film exposes the second insulating film between adjacent source lines, and
the sub-common electrode is formed on the second insulating film between the adjacent source lines.

9. A liquid crystal display device, comprising:
a first substrate including;
a semiconductor layer,
a first insulating film covering the semiconductor layer,
a gate line formed on the first insulating film and extending in a first direction,
a second insulating film covering the gate line,
a source line extending in a second direction orthogonally crossing the first direction on the second insulating film,
a contact portion formed on the second insulating film, the contact portion contacting with the semiconductor layer,
a third insulating film covering the source line and exposing the contact portion and the second insulating film in a circumference of the contact portion,
a first main-common electrode extending along the source line in the second direction on the third insulating film,
a fourth insulating film covering the first main-common electrode,
a second main-common electrode extending in the second direction on the fourth insulating film, the second main-common electrode facing the source line and being set to the same potential as the first main-common electrode, and
a pixel electrode including a main pixel electrode apart from the second main-common electrode and extending in the second direction on the fourth insulating film, the pixel electrode being electrically connected with the contact portion, and
a first alignment film covering the second main-common electrode and the pixel electrode,
a second substrate arranged so as to face the first substrate; and
a liquid crystal layer held between the first substrate and the second substrate.

10. The liquid crystal display device according to claim 9, wherein
the second substrate includes a third main-common electrode extending in the second direction so as to face the second main-common electrode and set to the same potential as the second main-common electrode, and
a second alignment film covers the third main-common electrode.

11. The liquid crystal display device according to claim 9, wherein
the first substrate includes a first auxiliary capacitance line and a second auxiliary capacitance line extending in the first direction, respectively, and
the gate line is arranged between the first auxiliary capacitance line and the second auxiliary capacitance line.

12. The liquid crystal display device according to claim 11, wherein
the first substrate includes;
a first sub-pixel electrode connected with one end of the main pixel electrode and arranged on the first auxiliary capacitance line, the first sub-pixel electrode being electrically connected with the contact portion and extending in the first direction, and
a second sub-pixel electrode connected with another end of the main pixel electrode and arranged on the second auxiliary capacitance line extending in the first direction.

13. The liquid crystal display device according to claim 9, wherein
the first main-common electrode is arranged on a main electrode side rather than an overlapping region with the source line, and
the second main-common electrode has a smaller width than width of the source line and is arranged in an overlapping region with the source line.

14. A liquid crystal display device, comprising:
a first substrate including;
a semiconductor layer,
a first insulating film covering the semiconductor layer,
a gate line extending in a first direction on the first insulating film,
a second insulating film covering the gate line,
a source line extending in a second direction orthogonally crossing the first direction on the second insulating film,
a contact portion formed on the second insulating film, the contact portion contacting with the semiconductor layer,
a third insulating film covering the source line, and exposing the contact portion and the second insulating film in a circumference of the contact portion,
a sub-common electrode extending in the first direction so as to face the gate line and crossing the source line on the third insulating film,
a fourth insulating film covering the sub-common electrode,
a first main-common electrode extending in the second direction on the fourth insulating film, the first main-common electrode facing the source line, and
a pixel electrode including a main pixel electrode apart from the first main-common electrode and extending in the second direction on the fourth insulating film, the pixel electrode being electrically connected with the contact portion, and
a first alignment film covering the first main-common electrode and the pixel electrode, a second substrate arranged so as to face the first substrate, and a liquid crystal layer held between the first substrate and the second substrate.

15. The liquid crystal display device according to claim 14, wherein the second substrate includes a second main-common electrode extending in the second direction so as to face the first main-common electrode, the second main-common electrode is set to the same potential as the first main-common electrode, and a second alignment film covers the second main-common electrode.

16. The liquid crystal display device according to claim 14, wherein the gate line includes first and second gate lines extending in the first direction, the first substrate includes an auxiliary capacitance line arranged between the first gate line and the second gate line extending in the first direction, respectively.

17. The liquid crystal display device according to claim 16, wherein the first substrate includes;

a sub-pixel electrode connected with the main pixel electrode and arranged on the auxiliary capacitance line, the sub-pixel electrode being electrically connected with the contact portion and extending in the first direction.

18. The liquid crystal display device according to claim 14, wherein the first substrate includes a cover element covering the contact portion and formed of the same material as the sub-common electrode.

19. The liquid crystal display device according to claim 18, wherein the sub-common electrode and the cover element are formed of transparent conductive material.

* * * * *